(12) United States Patent
Audigie

(10) Patent No.: US 9,521,801 B2
(45) Date of Patent: Dec. 20, 2016

(54) AGRICULTURAL MACHINE WITH FOLDABLE EXTENSION ARM

(71) Applicant: KUHN S.A., Saverne (FR)

(72) Inventor: Jean-Charles Audigie, Bouxwiller (FR)

(73) Assignee: KUHN S.A., Saverne (FR)

( * ) Notice: Subject to any disclaimer, the term of this patent is extended or adjusted under 35 U.S.C. 154(b) by 29 days.

(21) Appl. No.: 14/402,992

(22) PCT Filed: Jun. 20, 2013

(86) PCT No.: PCT/FR2013/051440
§ 371 (c)(1),
(2) Date: Nov. 21, 2014

(87) PCT Pub. No.: WO2013/190242
PCT Pub. Date: Dec. 27, 2013

(65) Prior Publication Data
US 2015/0107500 A1    Apr. 23, 2015

(30) Foreign Application Priority Data

Jun. 22, 2012    (FR) ...................................... 12 55913

(51) Int. Cl.
| | | |
|---|---|---|
| *A01B 73/06* | (2006.01) | |
| *A01B 73/04* | (2006.01) | |
| *A01B 63/14* | (2006.01) | |

(52) U.S. Cl.
CPC ............... *A01B 73/06* (2013.01); *A01B 63/14* (2013.01); *A01B 73/044* (2013.01)

(58) Field of Classification Search
CPC .................... A01B 73/00; A01B 73/02; A01B 73/06–73/067

USPC ..................... 111/18–22, 52–62; 172/78, 311
See application file for complete search history.

(56) References Cited

U.S. PATENT DOCUMENTS

| | | | |
|---|---|---|---|
| 4,137,852 A | * | 2/1979 | Pratt ...................... A01C 7/208 111/57 |
| 4,364,581 A | | 12/1982 | Shoup |
| 5,232,054 A | | 8/1993 | Van Blaricon et al. |
| | | (Continued) | |

FOREIGN PATENT DOCUMENTS

EP      1 205 098 A1    5/2002

OTHER PUBLICATIONS

U.S. Appl. No. 14/403,843, filed Nov. 25, 2014, Audigie, et al.
International Search Report issued Oct. 4, 2013 in PCT/FR2013/051440 Filed Jun. 20, 2013.

*Primary Examiner* — John G Weiss
(74) *Attorney, Agent, or Firm* — Oblon, McClelland, Maier & Neustadt, L.L.P.

(57) ABSTRACT

An agricultural machine for working soil or for sowing seeds, including a trailed chassis and work elements distributed over a transverse beam including a central section including wheels and two side sections extending on either side of the central section during work, each end of the central section resting on the ground via a wheel. Each side section includes an extension arm and an intermediate arm, the extension arm is connected to the intermediate arm by a horizontal articulation with a substantially horizontal axis and is directed in a direction of advance at work and each intermediate arm is connected to the chassis via a vertical articulation and carries at least one work element.

12 Claims, 3 Drawing Sheets

(56) References Cited

U.S. PATENT DOCUMENTS

| | | | |
|---|---|---|---|
| 6,408,950 B1* | 6/2002 | Shoup | A01B 73/065 111/57 |
| 6,502,645 B1 | 1/2003 | Brueggen et al. | |
| 6,935,254 B2* | 8/2005 | Ostrander | A01B 73/065 111/174 |
| 7,469,648 B2* | 12/2008 | Bettin | A01B 73/065 111/200 |
| 7,640,873 B2* | 1/2010 | Chiavario | A01B 73/065 111/175 |
| 7,762,201 B2* | 7/2010 | Jaime | A01B 73/065 111/185 |
| 2004/0050563 A1* | 3/2004 | Shoup | A01B 73/065 172/311 |
| 2014/0034341 A1* | 2/2014 | Fast | A01B 73/044 172/311 |
| 2014/0311391 A1 | 10/2014 | Audigie et al. | |
| 2014/0379230 A1* | 12/2014 | Koch | A01B 73/065 701/50 |

\* cited by examiner

AGRICULTURAL MACHINE WITH FOLDABLE EXTENSION ARM

BACKGROUND

The present invention relates to the general technical field of agricultural machinery. The invention relates to an agricultural machine for soil-working or for sowing seeds having a trailed chassis and work elements distributed over a transverse beam comprising a central section provided with wheels and two side sections extending on either side of said central section during work, each end of said central section rests on the ground via a wheel.

Such an agricultural machine made in the form of a seeder is known from document FR 2 957 221. This seeder has a trailed chassis with a transverse beam on which are distributed work elements such as seeder elements. The transverse beam comprises a central fixed section provided with wheels and two side sections which extend on either side of the central section. Each side section is articulated with the central section according to two horizontal articulations oriented in the direction of advance at work. Both articulations are connected through a connecting rod. Each side section rests on the ground via two wheels. By means of the horizontal articulations, each side section may be oriented independently of the central section in order to follow the slopes of the land. Thus, the side section may rise and/or move downwards for following the land. When the side section is caused to pivot around one of the articulations in order to follow the land, the closest seeder element to the central section tends to move closer to the piece of equipment at the border of the central section. This phenomenon is enhanced when the outer end of the side section is brought into a lower position than that of the central section. In certain cases, the tilt of the side section is such that it generates deterioration of the seeder element and/or of the piece of the equipment. For such an agricultural machine, as soon as a seeder element or a piece of equipment is damaged, the seeder has to be considered as unable to work. The repair costs may be high.

BRIEF SUMMARY

The object of the present invention is to find a remedy to the aforementioned drawbacks and aims at proposing an agricultural machine with a large width with accurate following of the land without any risk of deterioration of the agricultural machine.

According to the invention, the agricultural soil-working machine is characterized in that each side section consists of an extension arm and of an intermediate arm, said extension arm is connected to said intermediate arm by means of a horizontal articulation with a substantially horizontal axis and directed in the direction of advance at work and that each intermediate arm is connected to the chassis via a vertical articulation and carries at least one work element. By these characteristics, the work element(s) connected to the intermediate arm do not have any relative movement with respect to the central section respectively to the chassis in the work configuration. Therefore there is no risk of making the agricultural machine unable for work, upon its use on a sloped piece of land.

BRIEF DESCRIPTION OF THE DRAWING

Other features and advantages of the invention will emerge from the description which follows with reference to the appended drawings which are only given as non-limiting examples of the invention. In these drawings.

DETAILED DESCRIPTION

Figure 1:
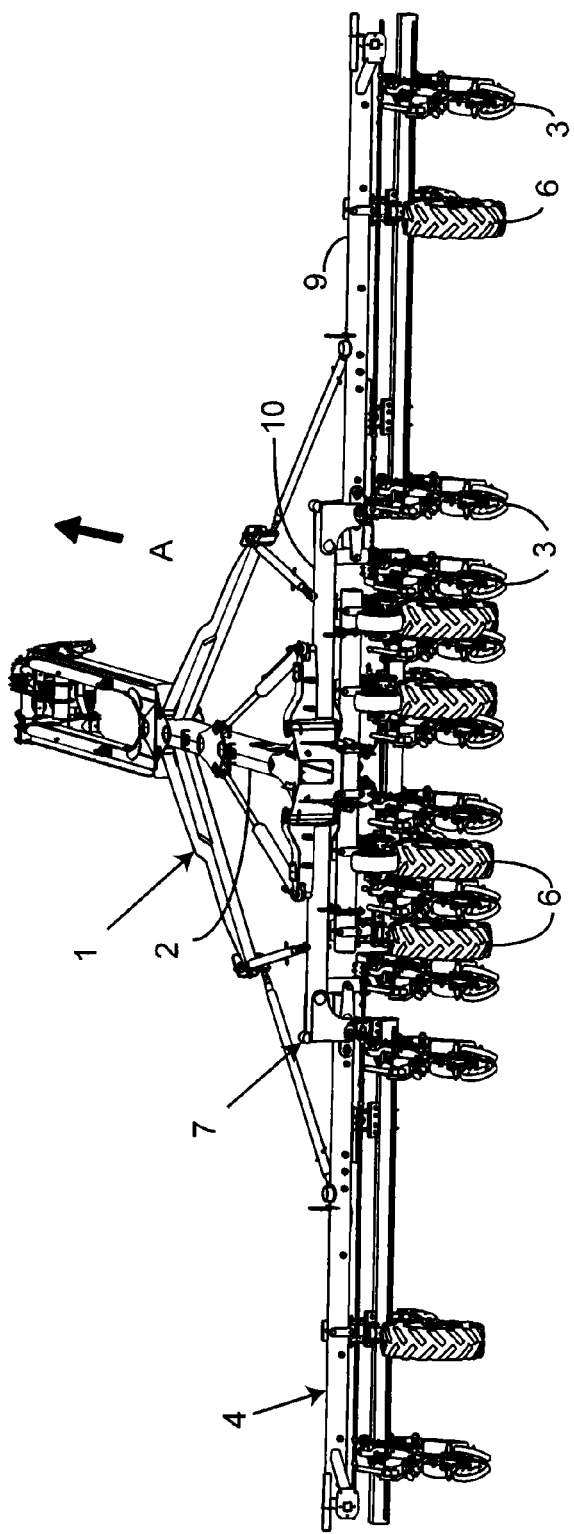
FIG. 1 is a perspective view of an agricultural soil-working machine according to the invention, in a work configuration.

The agricultural machine (1) for soil-working or for sowing seeds according to the invention, comprises a trailed chassis (2) and work elements (3) distributed over a transverse beam (4) in several sections which allows the agricultural machine (1) to intervene on a wide working strip of at least 12 meters. The transverse beam (4) comprises a central section (5) provided with wheels (6) and two side sections (7) which extend on either side of said central section (5) during work. Such a working width imposes that the side sections (7) be folded for displacements on roads and paths in order to reduce the width of the agricultural machine (1). Jacks make it possible to fold the side sections (7) forwards by pivoting around a respective vertical articulation (8) for reducing the bulkiness in width for road transport. The side sections (7) are positioned substantially parallel to the chassis (2) during transport. In order to use the roadway network, roadway legislation of most countries impose that a road clearance be observed. Thus, the maximum width of the machine during transport should be less than 3.50 meters, for example in France. A maximum limit also exists as to the height and the length of the agricultural machine (1). According to an alternative, the side sections (7) fold backwards for limiting the transport width.

FIG. 1 is a perspective according to a top and rear view of the agricultural machine (1). The chassis (2) is made in the form of a longitudinal bar equipped at the front with a hitching device intended to be hitched up to the hitching system of a tractor (not shown). The tractor moves and drives the agricultural machine (1) along a direction of advance indicated by the arrow (A). In the work configuration, the sections (5, 7) are positioned in the extension of each other so as to be aligned. They extend substantially transversely taking into account the direction of advance (A). The chassis (2) and the central section (5) in particular rest on the ground by means of wheels (6). During work, the wheels (6) ensure the function of regulating the work depth of the work elements (3). The wheels (6) fastened to the central section (5) rest on the ground during the transport of the agricultural machine (1). Thus, the wheels (6) connected to the central section (5) are used both during work and during transport. The wheels (6) are arranged on either side of the central section (5) within the limit of the road clearance. At least one wheel (6) is placed at each end of the central section (5) for ensuring good stability when using the agricultural machine (1). The bulkiness in width of the central section (5) with the wheels (6) is within the allowed limit of the roadway clearance. In the exemplary embodiment of the figures, the central section (5) rests on the ground via four wheels (6).

The work elements (3) are regularly fastened with constant spacing on the transverse beam (4). They have the function of producing an action on the ground, either for example working the soil or planting seeds in the soil. The spacing between the work elements (3) is adjustable. They are symmetrically distributed with respect to the median vertical plane of the agricultural machine (1). All the work elements (3) are not illustrated in the figures. In order to ensure a uniform working depth over the whole length of the transverse beam (4), it is important that all the work elements (3) accurately follow the piece of land.

According to an important feature of the invention, each side section (7) consists of an extension arm (9) and of an intermediate arm (10), said extension arm (9) is connected to said intermediate arm (10) by means of a horizontal articulation (11) with a substantially horizontal axis and directed in the direction of advance (A) at work and each intermediate arm (10) is connected to the chassis (2) via a vertical articulation (8) and bears at least one work element (3). By these features, the work elements (3) of the extension arm (9) follow the profile of the piece of land by pivoting around the horizontal articulation (11) while the work element(s) (3) of the intermediate arm (10) keep(s) a fixed position with respect to the chassis (2). With these work element(s) (3) mounted on the intermediate arm (10), the risk of deteriorating one of the elements of the agricultural machine (1) and thus making it unable for work during its use on a sloped piece of land is ruled out.

Indeed, the intermediate arm (10) does not have any relative motion with respect to the chassis (2) in the work configuration. The vertical articulation (8) does not allow motion of the intermediate arm (10) in a vertical plane. The reference system for following the land for said at least one work element (3) of the intermediate arm (10) is the central section (5) and in particular the wheels (6) of the central section (5). The adjustment of the working depth of the work elements (3) of the intermediate arm (10) is identical to that of the work elements (3) of the central section (5). Each extension arm (9) has at least one wheel (6) achieving support on the ground for the side section (7) and ensuring the control of the depth of the work elements (3). Preferentially, said at least one wheel (6) substantially extends opposite to the horizontal articulation (11). This wheel (6) allows the extension arm (9) to follow the piece of land. The extension arm (9) is then substantially parallel to the profile of the piece of land.

Figure 2:
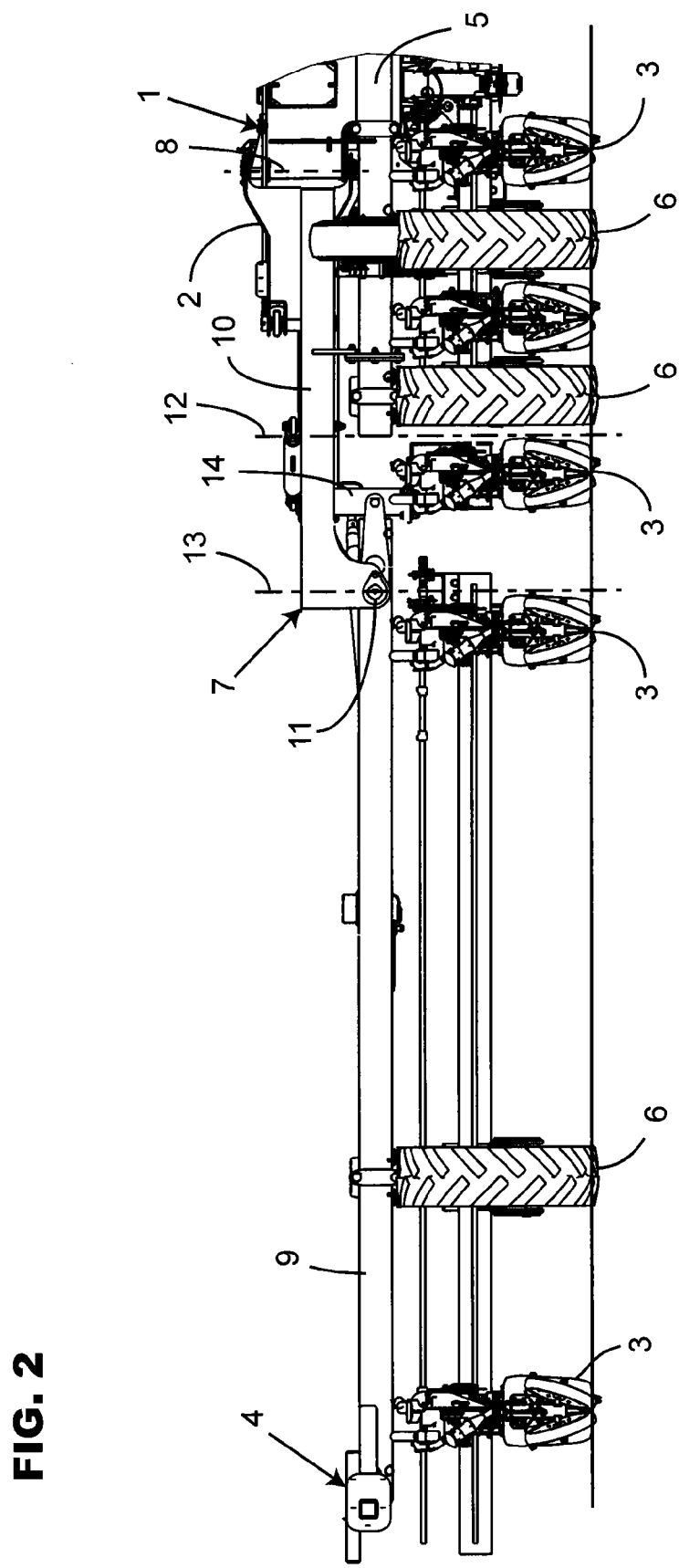
FIG. 2 is a rear view of a side section of the agricultural machine working on a flat piece of land.
Figure 3:
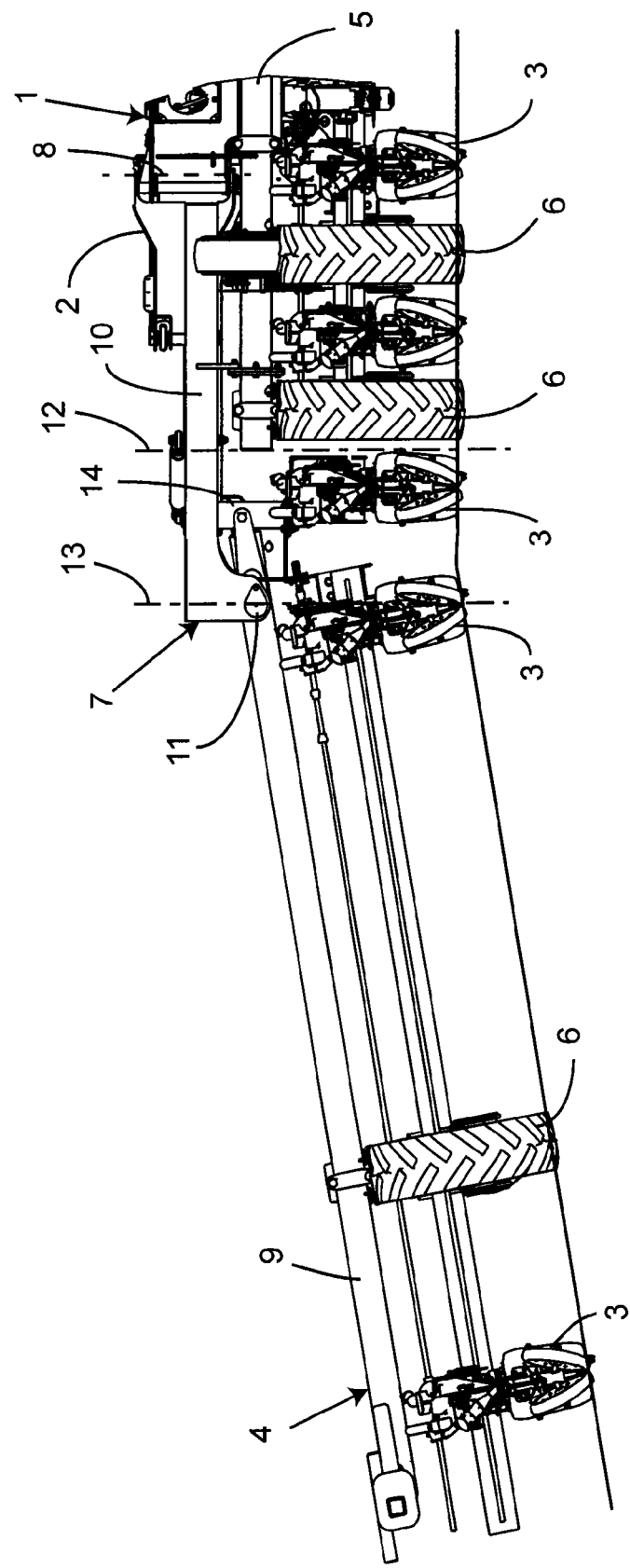
FIG. 3 is a rear view of a side bar section of the agricultural machine working on a piece of land with a left slope.

FIG. 2 illustrates a rear view of a portion of the agricultural machine (1) and more specifically the left portion considering the direction of advance (A). The side section (7) is illustrated in a work position on a flat piece of land. The side section (7) is substantially aligned with the central section (5). The different work elements (3) illustrated in FIG. 2, are therefore substantially aligned. FIG. 3 illustrates a view comparable with FIG. 2 when the piece of land has a flat portion on which circulate the wheels (6) of the central section (5) and a sloped portion on which the work elements of the extension arm (9) will have to move.

In the exemplary embodiment of the figures, the intermediate arm (10) carries a single work element (3). The extension arm (9) carries the other work elements (3) of the side section (7). All the work elements (3) of the side section (7) do not follow the same reference system. The work elements (3) of the extension arm (9) follow the piece of land by means of the wheel (6) mounted at the end of the extension arm (9). For properly following the piece of land, the wheel (6) extends at least into the most external half of the extension arm (9). The work elements (3) of the intermediate arm (10) follow the piece of land by means of the wheels (6) of the central section (5).

According to FIGS. 2 and 3, said at least one work element (3) of the intermediate arm (10) extends between a first vertical plane (12) passing through the end of the central section (5) and a second vertical plane (13) passing through the horizontal articulation (11). The length of the central section (5) is such that the first vertical planes (12) on either side define the width limits for the roadway clearance. The first vertical plane (12) and the second vertical plane (13) are substantially parallel to the median vertical plane of the agricultural machine (1). The axis of the vertical articulation (8) is also substantially parallel to the median vertical plane of the agricultural machine (1).

Further, the work element (3) mounted on the intermediate arm (10) is adjacent to the wheel (6) arranged at the border of the central section (5). For improved stability during work and displacements, at least one wheel (6) is mounted at each end of the central section (5). The presence of a space without any structural element is also noted between the work element (3) of the intermediate arm (10) and the other work elements (3) mounted on the extension arm (9). This free space is reduced in the work configuration of FIG. 3; it makes it possible to avoid a collision upon pivoting the extension arm (9) around the horizontal articulation (11). The width of the space substantially corresponds to the spacing adjusted between two work elements (3). By means of this free space, the displacement freedom in the vertical plane around the horizontal articulation (11) of each extension arm (9) is greater. The horizontal articulation (11) substantially extends above the work elements (3). According to the illustrated exemplary embodiment, a work element (3) of the extension arm (9) substantially extends under the horizontal articulation (11). Thus, when the extension arm (9) pivots, the portions of this work element the furthest away from the horizontal articulation (11) move the closest to the central section (5). By means of the free space between this work element and that related to the intermediate arm (10), there is no risk of deteriorating one of the pieces of equipment of the agricultural machine (1). The extension arm (9) and in particular its work elements (3) may therefore accurately follow the piece of land without deteriorating one of the pieces of equipment (work element, wheel) of the agricultural machine (1).

Moreover, each work element (3) of the intermediate arm (10) is mounted on the intermediate arm (10) by means of a support (14). The support (14) is for example made in the form of a substantially vertical tube on which is fastened a rail intended to receive the work element (3). The support (14) achieves guidance for the extension arm (9) upon pivoting around the horizontal articulation (11). With this guidance, it is possible to limit the forward and in particular rearward movements of the extension arm (9). These movements cause significant forces at the end of the extension arm (9) at the horizontal articulation (11). This guidance is therefore an offset supporting point on the extension arm (10) in order to relieve the horizontal articulation (11). In one alternative, a single support (14) carries the different work elements (3) of the intermediate arm (10).

The agricultural machine (1) illustrated in FIG. 1 is a machine for sowing seeds. In particular, this is a precision or single seeder. The work elements (3) are elements intended to distribute the seeds one by one and to plant them in a seed line with constant spacings. The work element (3) is thus a seeder element having a hopper, a distribution, burying elements and depth control elements. The seeder element may also comprise tamping and/or covering elements. The mounting of the seeder element on the transverse beam (4) takes place with a deformable parallelogram which allows it to be displaced parallel to the ground in order to individually adapt to the bumps and recesses of the ground. In the case of a seeder with a central hopper, the seeder element will have a hopper with reduced capacity, also called a relay hopper. The chassis (2), illustrated in FIG. 1, may support a reservoir (not shown) which is intended to contain the product to be distributed by the seeder. The product may be seeds or fertilizer in the form of manure.

In the case of a seeder, the compaction of the seed line in which the seeds will be deposited should be avoided, in this way, the soil-resting wheels (6) are arranged between the work elements (3). In order to observe the spacings between the different seed lines, a work element (3) is found on each side of a wheel (6). In this way, a work element (3) is arranged between the wheel (6) and the horizontal articulation (11). This work element (3) adjacent to the wheel (6) is fastened on the intermediate arm (10). The risk of interference between a work element of the extension arms (9) and a work element (3) without any relative motion with respect to the central section (5) is suppressed, even with a narrow spacing. In order to be able to sow different species, the spacing between the different work elements (3) is adjustable.

When the agricultural machine (1) is a soil-working machine, the work elements (3) are teeth or discs. The work elements (3) may also be a module consisting of several tools.

It is quite obvious that the invention is not limited to the embodiments described above and illustrated in the appended drawings. Modifications remain possible, in particular as regards the constitution or the number of the various elements or by substitution of technical equivalents, without however departing from the scope of protection as defined by the following claims.

The invention claimed is:

1. An agricultural machine for working soil or for sowing seeds, comprising:
   a trailed chassis; and
   work elements distributed over a transverse beam including a central section including wheels and two side sections extending on either side of the central section during work,
   wherein each end of the central section rests on ground via one of the wheels, wherein each side section includes an extension arm and an intermediate arm, the extension arm is connected to the intermediate arm by a horizontal articulation with a substantially horizontal axis and s directed in a direction of advance at work, and each intermediate arm is connected to the chassis via a vertical articulation and carries at least one of the work elements,
   wherein each work element of the intermediate arm is mounted on the intermediate arm by a respective support, and
   wherein the extension arm extends past the horizontal articulation towards the intermediate arm to contact the support of one of the work elements of the intermediate arm.

2. An agricultural machine according to claim 1, wherein according to a rear view during work, the at least one work element carried by the respective intermediate arm extends between a first vertical plane passing through the end of the central section and a second vertical plane passing through the horizontal articulation.

3. An agricultural machine according to claim 1, wherein other of the work elements of the side section are mounted on the extension arm.

4. An agricultural machine according to claim 1, wherein one of the work elements is mounted on the extension arm and substantially extends under the horizontal articulation.

5. An agricultural machine according to claim 1, wherein between the work element of the intermediate arm and work element of the extension arm a free space is arranged corresponding to a spacing defined between two neighboring work elements.

6. An agricultural machine according to claim 1, wherein a single support carries the different work elements of the intermediate arm.

7. An agricultural machine according to claim 1, wherein the support guides the extension arm upon its pivoting around the horizontal articulation to limit forward and rearward movement of the extension arm.

8. An agricultural machine according to claim 1, wherein the at least one work element mounted on the intermediate arm is adjacent to one of the wheels arranged at a border of the central section.

9. An agricultural machine according to claim 1, wherein the intermediate arm carries a single work element.

10. An agricultural machine according to claim 1, which is a seeder.

11. An agricultural machine according to claim 1, which is an agricultural soil-working machine.

12. An agricultural machine according to claim 1, wherein an end of the extension arm that extends past the horizontal articulation towards the intermediate arm overlaps the support of the one of the work elements in the direction of advance at work.

* * * * *